Sept. 16, 1930.  E. P. DU PONT  1,775,935

AUTOMOBILE BODY CONSTRUCTION

Filed Jan. 26, 1928

WITNESS:

INVENTOR
Eleuthere Paul du Pont
BY
ATTORNEYS.

Patented Sept. 16, 1930

1,775,935

UNITED STATES PATENT OFFICE

ELEUTHERE PAUL DU PONT, OF MONTCHANIN, DELAWARE

AUTOMOBILE BODY CONSTRUCTION

Application filed January 26, 1928. Serial No. 249,549.

The objects of the invention are to usefully utilize space in an automobile body that is usually wasted, to improve the appearance of the car by an apparent lengthening of the motor compartment, and to effect these purposes while still providing sufficient ventilation in the region of the foot pedals.

These objects are attained by a construction one preferred of which is shown in the drawings, in which—

Figure 2:
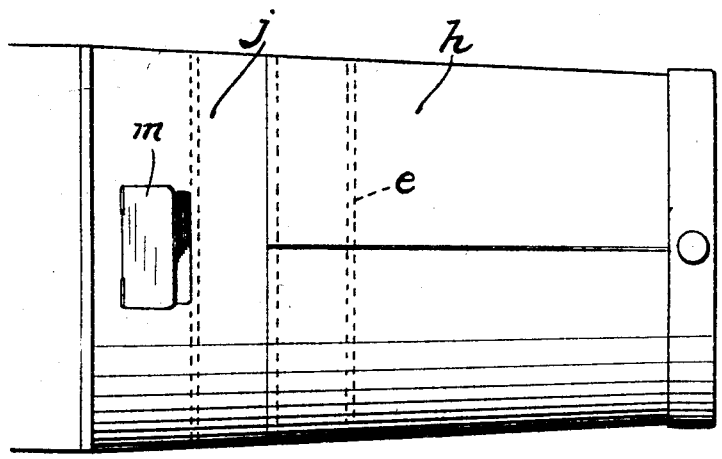
Fig. 2 is a plan view of a part of Fig. 1.
Figure 1:
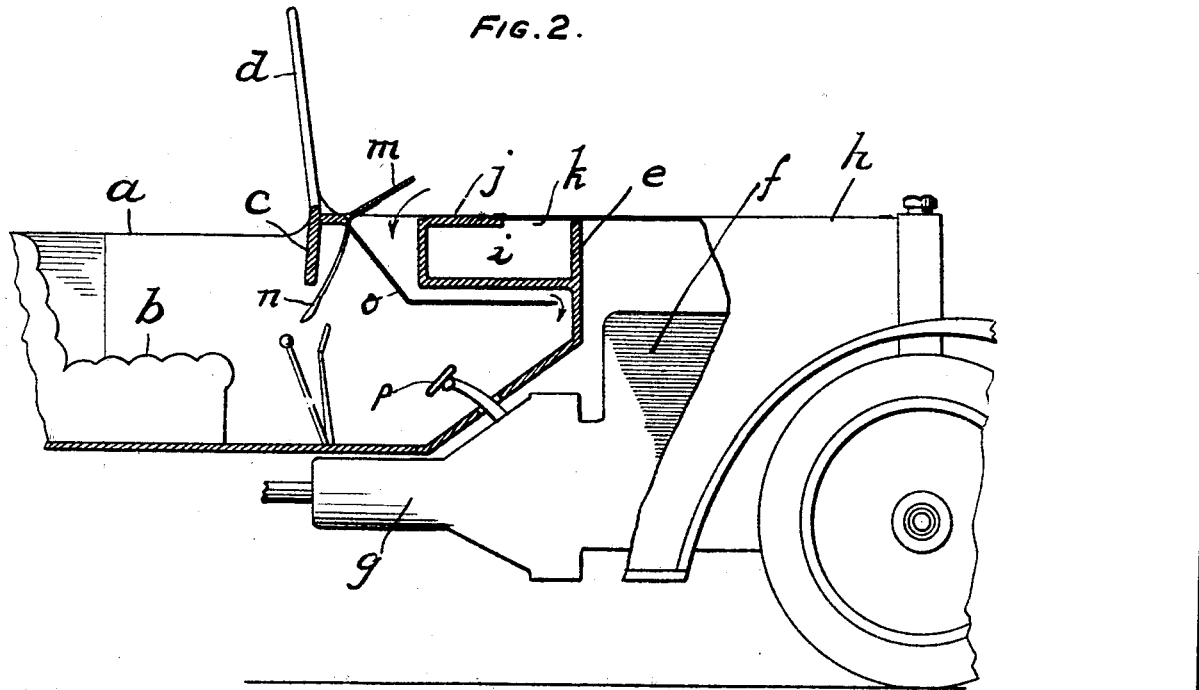
Fig. 1 is a view, partly in side elevation and partly in section, of the front of a motor vehicle.

$a$ is the vehicle body, $b$ the driver's seat, $c$ the instrument board, $d$ the windshield, $e$ the dash board, $f$ the motor casing, $g$ the gear box, $h$ the motor hood, $j$ the cowl.

Extending rearward from the dash board $e$ is a box $i$, which is preferably shallow relatively to its length as measured longitudinally of the car. The cowl $j$ forms the closed top of the rear of the box. In front of the cowl the box is provided with a top opening $k$. The motor hood $h$ extends behind the dash board a distance sufficient to overlap the top opening $k$ in the box $i$. The box $i$ may be utilized for tools and for other purposes and occupies a space that is usually wasted.

The rear of the box $i$ is spaced from the instrument board $d$ a distance sufficient to accommodate a ventilating opening in the cowl. At this opening is positioned a ventilator $m$ operable from a lever $n$. A baffle $o$ extends from the rear of the ventilating opening downward and forward back of the box $i$ and thence forward under and spaced from the bottom of box $i$ and terminates back of the dash board $e$, thereby conducting cool air to the space in the region of the foot pedals $p$.

I am aware that it is not new to provide a box extending back from the dash board to the cowl and which is provided with an open top which is closed by the rear end of the motor hood. Such boxes, however, are quite narrow measured in the direction of the length of the car and in order to give them the required capacity are made objectionably deep; and the space occupied by the feet of the driver is so reduced as to more or less interfere with the operation of the usual ventilator in the cowl. In my invention, by moving the dash forward and extending the box under the cowl and providing the special ventilating means described, a box of ample capacity is provided, the appearance of the car is improved and ample ventilation is secured.

Having now fully described my invention, what I claim and desire to protect by Letters Patent is:

In a motor vehicle, in combination, a vehicle body, a dash board at the front of the body, an instrument board behind and spaced from the dash board, a box extending rearwardly from the dash board and overhanging the space for foot pedals in the front of the body, a ventilator in the space between the rear of said box and the instrument board, and a baffle extending from the ventilator downwardly back of said box and then forwardly under and spaced from said box.

In testimony of which invention, I have hereunto set my hand, at Wilmington, Delaware, on this 19th day of January, 1928.

ELEUTHERE PAUL DU PONT.